US011947393B2

(12) United States Patent (10) Patent No.: US 11,947,393 B2
Xu et al. (45) Date of Patent: Apr. 2, 2024

(54) FOLDABLE SCREEN AND DISPLAY DEVICE

(71) Applicants: Chengdu BOE Optoelectronics Technology Co., Ltd., Sichuan (CN); BOE Technology Group Co., Ltd., Beijing (CN)

(72) Inventors: Renzhe Xu, Beijing (CN); Bin Zhang, Beijing (CN); Haotian Yang, Beijing (CN); Yiming Wang, Beijing (CN); Wei Gong, Beijing (CN); Jingyu Piao, Beijing (CN); Xiaodong Hao, Beijing (CN); Danyang Bi, Beijing (CN); Kang Wang, Beijing (CN); Inho Park, Beijing (CN); Xiaoliang Fu, Beijing (CN); Yuanyuan Chai, Beijing (CN); Seungyong Oh, Beijing (CN)

(73) Assignees: Chengdu BOE Optoelectronics Technology Co., Ltd., Sichuan (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 17/684,987

(22) Filed: Mar. 2, 2022

(65) Prior Publication Data
US 2022/0283607 A1 Sep. 8, 2022

(30) Foreign Application Priority Data
Mar. 4, 2021 (CN) .......................... 202110240963.9

(51) Int. Cl.
 *G06F 1/16* (2006.01)
 *H04M 1/02* (2006.01)
(52) U.S. Cl.
 CPC .......... *G06F 1/1641* (2013.01); *G06F 1/1652* (2013.01); *H04M 1/0268* (2013.01)

(58) Field of Classification Search
 CPC .... G06F 1/1641; G06F 1/1652; G06F 1/1681; H04M 1/0268
 See application file for complete search history.

(56) References Cited

U.S. PATENT DOCUMENTS

| 10,310,551 | B2* | 6/2019 | Bae ...................... G06F 1/1616 |
| 2014/0042293 | A1* | 2/2014 | Mok ................... H04M 1/0216 |
| | | | 248/682 |

(Continued)

FOREIGN PATENT DOCUMENTS

| CN | 111343310 A | 6/2020 |
| CN | 210955912 U | 7/2020 |

(Continued)

OTHER PUBLICATIONS

CN202110240963.9 first office action.

*Primary Examiner* — James Wu
(74) *Attorney, Agent, or Firm* — IPro, PLLC

(57) ABSTRACT

Disclosed are a foldable screen and a display device. The foldable screen includes: a flexible display panel and a plurality of elastic portions, wherein each of the elastic portions includes each of elastic support members and two connecting rods fixedly connected to each of the elastic support members; wherein the two connecting rods are respectively connected to two flat portions of the flexible display panel, and the elastic support members are configured to supply a support force to the foldable portion in the case that a display surface of the foldable portion of the flexible display panel is coplanar with those of the flat portions.

19 Claims, 4 Drawing Sheets

(56) References Cited

U.S. PATENT DOCUMENTS

| | | |
|---|---|---|
| 2017/0205853 A1 | 7/2017 | Sun |
| 2019/0094916 A1 | 3/2019 | Bi |
| 2019/0104626 A1* | 4/2019 | Jeon .................... H05K 5/0226 |
| 2021/0307186 A1* | 9/2021 | Hong .................. H04M 1/0216 |
| 2022/0147101 A1* | 5/2022 | Shin ..................... G06F 1/1637 |

FOREIGN PATENT DOCUMENTS

| | | |
|---|---|---|
| CN | 211743160 U | 10/2020 |
| CN | 112037658 A | 12/2020 |
| WO | 2018148996 A1 | 8/2018 |

* cited by examiner

FOLDABLE SCREEN AND DISPLAY DEVICE

CROSS-REFERENCE TO RELATED APPLICATION

This application claims priority of the Chinese Patent Application No. 202110240963.9, filed on Mar. 4, 2021 and entitled "FOLDABLE SCREEN AND DISPLAY DEVICE," the content of which is incorporated herein by reference in its entirety.

TECHNICAL FIELD

The present disclosure relates to the field of display technologies and in particular, relates to a foldable screen and a display device.

BACKGROUND

As flexible display technologies become more and more mature, display devices with folding functions (such as a foldable mobile phone, a foldable tablet PC, or a foldable computer) will be a major trend in the future. Display portions of these display devices with the folding functions are foldable. Compared with traditional display devices, the display devices with the folding functions may be switched in physical size, which greatly improves the use experience of a user.

SUMMARY

Embodiments of the present disclosure provide a foldable screen and a display device.

In one aspect of the embodiments of the present disclosure, a foldable screen is provided. The foldable screen includes:

a flexible display panel, wherein the flexible display panel is provided with a display surface, and includes a foldable portion, and two flat portions disposed on two sides of the foldable portion; and a plurality of elastic portions disposed on a back surface of the flexible display panel, wherein each of the elastic portions includes an elastic support member and two connecting rods fixedly connected to the elastic support member, the two connecting rods being respectively connected to the two flat portions;

wherein the elastic support member is configured to supply a support force to the foldable portion in the case that a display surface of the foldable portion is coplanar with that of the flat portion.

In some embodiments, the elastic support member is a spring coil, and the connecting rod is connected to an end portion of the spring coil.

In some embodiments, the spring coil are integrated with the connecting rod.

In some embodiments, the elastic portion is configured to be in a deformation state to cause the spring coil to supply a support force to the foldable portion in the case that the display surface of the foldable portion is coplanar with that of the flat portion, and configured to be in an original state to release the support force supplied by the spring coils to the foldable portion in the case that the display surfaces of the two flat portions are folded to a preset angle.

In some embodiments, the foldable screen further includes a first rigid support bar disposed between the elastic support member and the foldable portion; wherein a surface, facing away from the foldable portion, of the first rigid support bar is connected to the elastic support member, and a surface, facing towards the foldable portion, of the first rigid support bar is in contact with the foldable portion.

In some embodiments, the surface, facing away from the foldable portion, of the first rigid support bar is provided with a snap groove, and the first rigid support bar is snap-engaged with the elastic support members via the snap groove.

In some embodiments, the foldable screen further includes a first soft support bar disposed between the first rigid support bar and the flexible display panel; wherein the first soft support bar is adhered to the first rigid support bar, and a surface, facing away from the first rigid support bar, of the first soft support bar is in contact with the foldable portion.

In some embodiments, a boundary of an orthographic projection of the first soft support bar on the flexible display panel is coincident with that of an orthographic projection of the first rigid support bar on the flexible display panel.

In some embodiments, the foldable screen further includes two second rigid support bars disposed on the back surface of the flexible display panel; wherein the two second rigid support bars are fixedly connected to the two flat portions respectively, and the two second rigid support bars are movably connected to the two connecting rods of the elastic portion respectively.

In some embodiments, the second rigid support bar is provided with an insertion hole, and an end, facing away from the elastic support member, of the connecting rod is disposed in the insertion hole.

In some embodiments, the foldable screen further includes two second soft support bars disposed between the two second rigid support bars and the flexible display panel; wherein the second soft support bar is adhered to the second rigid support bar and the flat portion.

In some embodiments, a boundary of an orthographic projection of the second soft support bar on the flexible display panel is coincident with that of an orthographic projection of the second rigid support bar on the flexible display panel.

In some embodiments, materials of both the first rigid support bar and the second rigid support bars include rigid plastic, and materials of both the first soft support bar and the second soft support bars include flexible foam.

In some embodiments, length directions of second rigid support bars are both parallel to that of the first rigid support bar.

In some embodiments, the two second rigid support bars are disposed at a same distance away from the first rigid support bar.

In some embodiments, the plurality of elastic portions are uniformly distributed in a length direction of the foldable portion.

In some embodiments, the foldable screen further includes a metal support layer connected to the back surface of the flexible display panel.

In some embodiments, the foldable screen further includes an adhesive layer disposed between the metal support layer and the flexible display panel.

In some embodiments, the flexible display panel is an organic light-emitting diode (OLED) display panel.

In another aspect of the embodiments of the present disclosure, a display device is provided. The display device includes: a power supply assembly and a foldable screen; wherein the power supply assembly configured to supply power to the foldable screen, and the foldable screen includes:

a flexible display panel, wherein the flexible display panel is provided with a display surface, and includes a foldable portion, and two flat portions disposed on two sides of the foldable portion; and a plurality of elastic portions disposed on a back surface of the flexible display panel, wherein each of the elastic portions includes an elastic support member and two connecting rods fixedly connected to the elastic support member, the two connecting rods being respectively connected to the two flat portions;

wherein the elastic support member is configured to supply a support force to the foldable portion in the case that the display surface of the foldable portion is coplanar with that of the flat portion.

DETAILED DESCRIPTION

In order to more clearly illustrate the objects, technical solutions and advantages of the present disclosure, embodiments of the present disclosure are described in further detail with reference to the accompanying drawings.

At present, a display screen of a display device with a folding function is generally referred to as a foldable screen. The foldable screen generally includes: a flexible display panel. The flexible display panel may include a foldable portion and two flat portions disposed on two sides of the foldable portion. In the case that a display surface of the foldable portion is coplanar with that of the flat portion, the foldable screen is in a flattened state; and in the case that the display surfaces of the two flat portions are at a preset angle, the foldable screen is in a folded state. Since the flexible display panel of the foldable screen is relatively thin, a support layer may be arranged on a back surface (i.e., a surface opposite to the display surface) of the flexible display panel to support the flexible display panel, thereby reducing a possibility of damage of the flexible display panel during a folding process.

The support layer is generally made of a stainless steel material, and in order to improve a bending property of the display device with the folding function, it is necessary to provide a plurality of openings arranged in an array in a region, which is in contact with the foldable portion of the flexible display panel, of the support layer. In this way, the support force supplied by the support layer to the foldable portion of the flexible display panel is reduced, such that the foldable portion of the flexible display panel is creased in the case that the foldable screen is in a flattened state, thereby affecting a display effect of the foldable screen.

Figure 1:
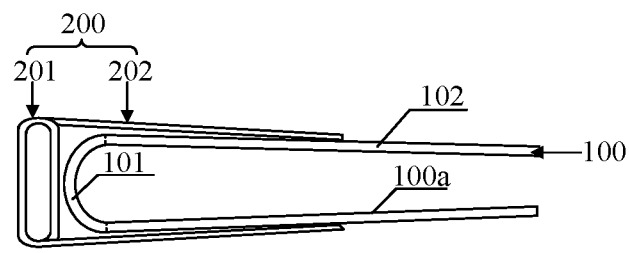
FIG. 1 is a schematic structural diagram of a foldable screen according to an embodiment of the present disclosure.

Referring to FIG. 1, a schematic structural diagram of a foldable screen 000 according to embodiments of the present disclosure is illustrated. The foldable screen 000 may include: a flexible display panel 100 and a plurality of elastic portions 200.

Figure 2:
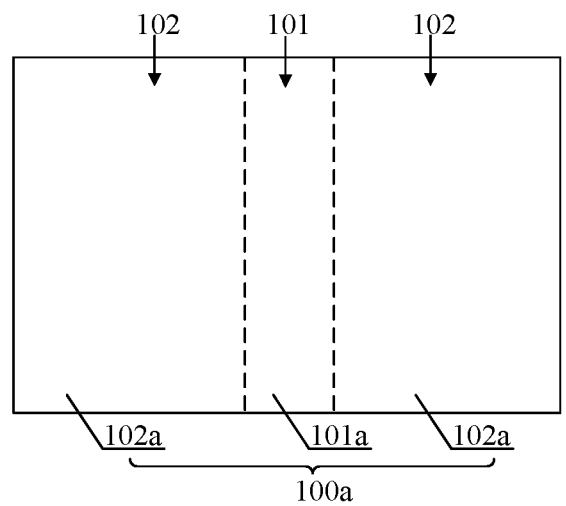
FIG. 2 is a top view of the flexible display panel with the foldable screen in FIG. 1 in a flattened state.

The flexible display panel 100 is provided with a display surface 100a, and may include a foldable portion 101 and two flat portions 102 disposed on two sides of the foldable portion 101. In the present disclosure, the display surface 100a of the flexible display panel 100 may be divided into three portions, namely a display surface of the foldable portion 101 and display surfaces of the two flat portions 102. Exemplarily, as illustrated in FIG. 2 that is a top view of the flexible display panel 100 with the foldable screen 000 in FIG. 1 in a flattened state, a display surface 101a of the foldable portion 101 of the flexible display panel 100 is generally rectangular, and display surfaces 102a of the two flat portions 102 of the flexible display panel 100 are generally provided with same shape and area. The display surface 101a of the foldable portion 101 and the display surfaces 102a of the two flat portions 102 together define the display surface 100a of the flexible display panel 100.

The plurality of elastic portions 200 are disposed on a back surface of the flexible display panel 100, wherein the back surface of the flexible display panel 100 according to embodiments of the present disclosure refers to: a surface, which is opposite to the display surface 100a, of the flexible display panel 100. Each of the elastic portions 200 may include each of elastic support members 201 and two connecting rods 202 fixedly connected to each of the elastic support members 201, wherein the two connecting rods 202 are respectively connected to the two flat portions 102 of the flexible display panel 100.

The elastic support members 201 may be configured to supply a support force to the foldable portion 101 in the case that the display surface 101a of the foldable portion 101 of the flexible display panel 100 is coplanar with the display surfaces 102a of the flat portions 102.

Figure 3:
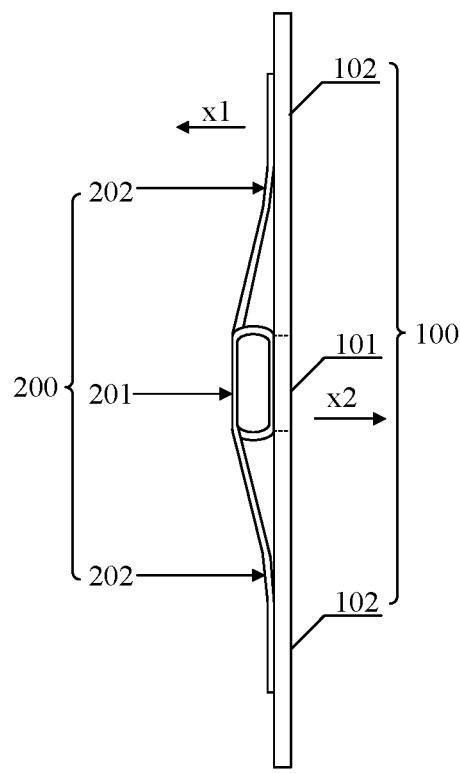
FIG. 3 is a side view of the foldable screen in FIG. 1 in a flattened state.

In the present disclosure, as illustrated in FIG. 2 and FIG. 3, FIG. 3 is a side view of the foldable screen 000 in FIG. 1 in a flattened state. In the case that the display surface 101a of the foldable portion 101 of the flexible display panel 100 of the foldable screen 000 is coplanar with the display surfaces 102a of the flat portions 102, the foldable screen 000 is in a flattened state. As illustrated in FIG. 1, the foldable screen 000 is in a folded state in the case that the display surfaces of the two flat portions 102 of the flexible display panel 100 of the foldable screen 000 are at a preset angle. For example, the preset angle may be 0 degree, 3 degrees, 10 degrees, or the like.

During a transition of the foldable screen 000 from the folded state to the flattened state, the connecting rods 202 of the elastic portions 200 may move in a first direction x1 going away from the flexible display panel 100 under a drive of the flat portions 102 connected to the connecting rods 202. In this way, the elastic support members 201 of the elastic portions 200, which are connected to the connecting rods 202, may move in a second direction x2 opposite to the first direction x1, wherein the second direction x2 is a direction in which the elastic support members 201 move proximal to the display surface 100a of the flexible display panel 100. In the case that the foldable screen 000 is in the flattened state, the elastic support members 201 of the elastic portions 200 are in close contact with the foldable portion 101, and the elastic support members 201 may supply a support force to the foldable portion 101 to reduce the probability that the foldable portion 101 of the flexible display panel 100 is creased, thereby effectively improving the display effect of the foldable screen 000.

In summary, the foldable screen according to the embodiments of the present disclosure includes the flexible display panel and the plurality of elastic portions. During a transition of the foldable screen from the folded state to the flattened state, the connecting rods of the elastic portions may move in a first direction going away from the flexible display panel under the drive of the flat portions connected to the connecting rods. In this way, the elastic support members of the elastic portions, which are connected to the connecting rods, may move in a second direction opposite to the first direction, wherein the second direction is a direction in which the elastic support members move proximal to the flexible display panel. In the case that the foldable screen is in the flattened state, the elastic support members of the elastic portions are in close contact with the foldable portion, and the elastic support members may supply a support force to the foldable portion to reduce the probability that the foldable portion of the flexible display panel is creased, thereby effectively improving the display effect of the foldable screen.

Exemplarily, as illustrated in FIG. 1 and FIG. 3, the elastic support members 201 may be spring coils, and the connecting rods 202 may be connected to ends of the spring coils. In one possible implementation, the spring coils may be integrated with the connecting rods. In this case, the elastic portions 200 composed of the spring coils and the connecting rods 202 may be called as torsion springs.

In the case that the display surface 101a of the foldable portion 101 of the flexible display panel 100 is coplanar with the display surfaces 102a of the flat portions 102 of the flexible display panel 100 (that is, the foldable screen 000 is in the flattened state), the torsion springs are in a deformation state such that the spring coils of the torsion springs may supply a support force to the foldable portion 101 of the flexible display panel 100; and in the case that the display surfaces 102a of the flat portions 102 of the flexible display panel 100 are folded to a preset angle (that is, the foldable screen 000 is in the folded state), the torsion springs are in an original state to release the support force supplied by the spring coils of the torsion springs to the foldable portion 101 of the flexible display panel 100.

In some embodiments, a material of the torsion springs may be a flexible metal material, for example, the flexible metal material may be alloy steel. The torsion springs may be made of an elastic flexible metal material with high extensibility and better toughness by twisting and rotating. In this way, the torsion springs may achieve good deformability.

It should be noted that in the case that the foldable screen 000 is in the folded state, a radius of the foldable portion 101 of the foldable screen 000 is a folding radius of the foldable screen 000. The magnitude of an elastic restoring force of the torsion springs is determined based on the folding radius of the foldable screen 000 and a flatness of the flexible display panel 100 of the foldable screen 000 in the flattened state. Furthermore, the elastic restoring force of the torsion springs needs to be less than a force for maintaining the foldable screen 000 in the flattened state, such that the foldable screen 000 may be smoothly flattened and maintain the flattened state. After the elastic restoring force of the torsion springs is determined, parameters of the torsion springs may be selected based on the elastic restoring force of the torsion springs. Herein, the parameters of the torsion springs may include: thicknesses of the torsion springs, the number of turns of the spring coils of the torsion springs, the number of the torsion springs of the foldable screen 000, or other parameters related to the elastic restoring force of the torsion springs.

It should be also noted that lengths of the spring coils of the torsion springs are positively related to the folding radius of the foldable screen 000, that is, the larger the folding radius of the foldable screen 000 is, the longer the spring coils of the torsion springs are. In the case that the foldable screen 000 is in the flattened state, length directions of the spring coils of the torsion springs are parallel to a width direction of the foldable portion 101.

Figure 4:
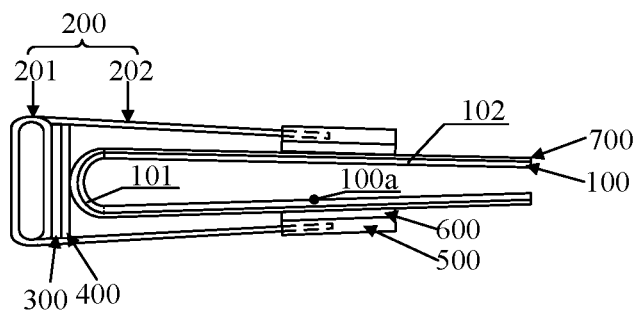
FIG. 4 is a schematic structural diagram of another foldable screen according to an embodiment of the present disclosure.

In some embodiments of the present disclosure, referring to FIG. 4, a schematic structural diagram of another foldable screen 000 is provided according to an embodiment of the present disclosure. The foldable screen 000 may further include: a first rigid support bar 300 disposed between elastic support members 201 and a foldable portion 101. A surface, facing away from the foldable portion 101 of the first rigid support bar 300 is connected to the elastic support members 201, and a surface, facing towards the foldable portion 101, of the first rigid support bar 300 is in contact with the foldable portion 101. In this way, the elastic support members 201 of elastic portions 200 may apply an acting force to the first rigid support bar 300 in the case that the foldable screen 000 is in the flattened state such that the first rigid support bar 300 may supply a rigid support to the foldable portion 101 of the flexible display panel 100. Since a whole surface of the first rigid support bar 300 is in contact with the foldable portion 101 in the case that the foldable screen 000 is in the flattened state, the first rigid support bar 300 may uniformly supply the rigid support to the foldable portion 101, thereby further reducing the probability of creasing of the foldable portion 101 of the flexible display panel 100. Exemplarily, in the case that a length direction of the first rigid support bar 300 is the same as that of the foldable portion 101, and the first rigid support bar 300 is as long as the foldable portion 101, the first rigid support bar 300 may supply the rigid support to the foldable portion 101 at any position in the case that the foldable screen 000 is in the flattened state, thereby further reducing the probability of creasing of the foldable portion 101 of the flexible display panel 100.

In the present disclosure, various possible implementations of a positional relationship between the first rigid support bar 300 and the foldable portion 101 of the flexible display panel 100 are provided, and the embodiments of the present disclosure are schematically illustrated by taking the following three possible implementations as examples:

In the first possible implementation, in the case that the foldable screen 000 is in the flattened state, an orthographic projection of the first rigid support bar 300 on the flexible display panel 100 is disposed in the foldable portion 101, and a boundary of the orthographic projection is completely coincident with that of the foldable portion 101.

In the second possible implementation, in the case that the foldable screen 000 is in the flattened state, the orthographic projection of the first rigid support bar 300 on the flexible display panel 100 is disposed in the foldable portion 101, the boundary of the orthographic projection is partially coincident with that of the foldable portion 101, and the orthographic projection may be disposed in a central region of the foldable portion 101.

In the third possible implementation, in the case that the foldable screen 000 is in the flattened state, the orthographic projection of the first rigid support bar 300 on the flexible display panel 100 is outside the foldable portion 101, and the foldable portion 101 is disposed in a central region of the orthographic projection.

In some embodiments, a surface, facing away from the foldable portion 101, of the first rigid support bar 300 is provided with snap grooves (not illustrated in the drawings), and the first rigid support bar 300 is snap-engaged with the elastic support members 201 via the snap grooves. In this way, a connection between the first rigid support bar 300 and the elastic support members 201 may be achieved. Exemplarily, in the case that the elastic support members 201 are spring coils, widths of openings of the snap grooves are positively related to the number of turns of the spring coils.

In the present disclosure, as illustrated in FIG. 4, the foldable screen 000 may further include: a first soft support bar 400 disposed between the first rigid support bar 300 and the flexible display panel 100. A shape of the first soft support bar 400 may be the same as that of the first rigid support bar 300. The first soft support bar 400 is adhered to the first rigid support bar 300, and a surface, facing away from the first rigid support bar 300, of the first soft support bar 400 is in contact with the foldable portion 101. In this way, the first soft support bar 400 may act as a cushion for the flexible display panel 100 during a transition of the foldable screen 000 from the flattened state to the folded state, thereby reducing the probability that the foldable portion 101 of the flexible display panel 100 is damaged due to an excessive support force generated by the elastic support members 201 of the elastic portions 200. Exemplarily, a boundary of an orthographic projection of the first soft support bar 400 on the flexible display panel 100 may be coincident with that of an orthographic projection of the first rigid support bar 300 on the flexible display panel 100 in the case that the foldable screen 000 is in the flattened state.

It should be noted that the first rigid support bar 300 in the above-described embodiments refers to a support bar made of a material with a relatively large modulus of elasticity, such that the first rigid support bar 300 is not easily deformed in the case that the first rigid support bar 300 is pressed by an external force and may supply a rigid support to the foldable portion 101 of the flexible display panel 100. Exemplarily, a material of the first rigid support bar 300 may include: rigid plastic, for example, the rigid plastic may be acrylonitrile butadiene styrene plastic (ABS). The first soft support bar 400 in the above-described embodiments refers to a support bar made of a material with a relatively small modulus of elasticity, such that the first soft support bar 400 is easily deformed in the case that the first soft support bar 400 is pressed by an external force and may act as a cushion for the foldable portion 101 of the flexible display panel 100. Exemplarily, a material of the first soft support bar 400 may include flexible foam, for example, the flexible foam may be soft foam.

In some embodiments of the present disclosure, referring to FIG. 4, the foldable screen 000 may further include two second rigid support bars 500 disposed on the back surface of the flexible display panel 100. The two second rigid support bars 500 are fixedly connected to the two flat portions 102 of the flexible display panel 100 respectively; and the two second rigid support bars 500 are movably connected to the two connecting rods 202 of each of the elastic portions 200 respectively.

Figure 5:
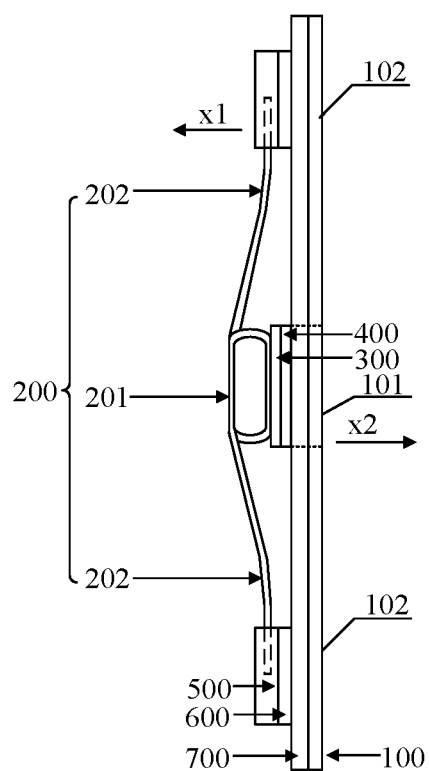
FIG. 5 is a schematic diagram of the foldable screen in FIG. 4 in a flattened state.

Exemplarily, referring to FIG. 5 that is a schematic diagram of the foldable screen 000 in FIG. 4 in a flattened state. During the transition of the foldable screen 000 from the folded state to the flattened state, the connecting rods 202 of the elastic portions 200 may move in a first direction x1 going away from the flexible display panel 100 under the drive of the flat portions 102 connected to the connecting rods 202. In this case, the connecting rods 202 may exert pressure onto the flat portions 102 of the flexible display panel 100. In the case that the connecting rods 202 are in direct contact with the flat portions 102 of the flexible display panel 100, the connecting rods 202 may exert relatively high pressure onto the flat portions 102 of the flexible display panel 100 due to the relatively small contact areas between the connecting rods 202 and the flat portions 102 of the flexible display panel 100, such that the flat portions 102 of the flexible display panel 100 are easily damaged under the pressure.

In the case that the second rigid support bars 500 are disposed between the connecting rods 202 and the flat portions 102 of the flexible display panel 100, the second rigid support bars 500 may enlarge the contact areas between the connecting rods 202 and the flat portions 102 of the flexible display panel 100 to reduce the pressure exerted by the connecting rods 202 onto the flat portions 102 of the flexible display panel 100, such that the second rigid support bars 500 may supply a rigid support to the flat portions 102 of the flexible display panel 100 to reduce the probability of damage of the flat portions 102 of the flexible display panel 100.

Figure 6:
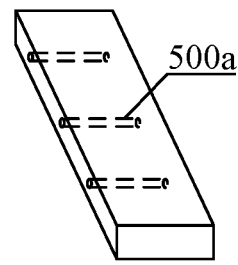
FIG. 6 is a schematic structural diagram of second rigid support bars in the foldable screen in FIG. 4.

In some embodiments, referring to FIG. 6 that is a schematic structural diagram of the second rigid support bars 500 of the foldable screen 000 in FIG. 4, the second rigid support bars 500 are provided with insertion holes 500*a*, and ends, facing away from the elastic support members 201, of the connecting rods 202 are disposed in the insertion holes 500*a*. In this way, movable connection between the connecting rods 202 and the second rigid support bars 500 may be achieved to facilitate the adjustment and replacement of the elastic portions 200 according to actual situations.

In some embodiments of the present disclosure, referring to FIG. 3, the foldable screen 000 may include: two second soft support bars 600 disposed between two second rigid support bars 500 and the flexible display panel 100. Shapes of the second soft support bars 600 may be the same as those of the second rigid support bars 500, and the second soft support bars 600 are adhered to the second rigid support bars 500 and the flat portions 102 of the flexible display panel 100. In this way, the second soft support bars 600 may act as a cushion for the flexible display panel 100, thereby reducing the possibility that the flat portions 102 of the flexible display panel 100 are damaged due to an excessive force generated by the connecting rods 202 of the elastic portions 200 in the case that the foldable screen 000 is in the flattened state. Exemplarily, a boundary of an orthographic projections of the second soft support bar 600 on the flexible display panel 100 may be coincident with that of an orthographic projection of the second rigid support bar 500 on the flexible display panel 100 in the case that the foldable screen 000 is in the flattened state.

In some embodiments, a material of the second rigid support bars 500 may also include rigid plastic, and the material of the second rigid support bars 500 may be the same as that of the first rigid support bar 300; and a material of the second soft support bars 600 may also include flexible foam, and the material of the second soft support bars 600 may be the same as that of the first soft support bar 400.

In some embodiments, referring to FIG. 4 and FIG. 5, the length directions of the two second rigid support bars 500 are parallel, length directions of the two second rigid support bars 500 are parallel to that of the first rigid support bar 300, and the two second rigid support bars 500 are disposed at the same distance away from the first rigid support bar 300. That is, in the case that the foldable screen 000 is in the flattened state, the two second rigid support bars 500 are mirror-symmetric relative to the first rigid support bar 300. In this way, it may be ensured that the flexible display panel 100 of the foldable screen 000 is stressed uniformly in the case that the foldable screen 000 is in the flattened state, thereby further reducing the possibility of damage of the flexible display panel 100.

It should be noted that the flexible display panel 100 of the foldable screen 000 may be shaped like a rectangular plate in the case that the foldable screen 000 is in the flattened state, and the length directions of the two second rigid support bars 500 are parallel to a width direction of the flexible display panel 100.

Figure 7:
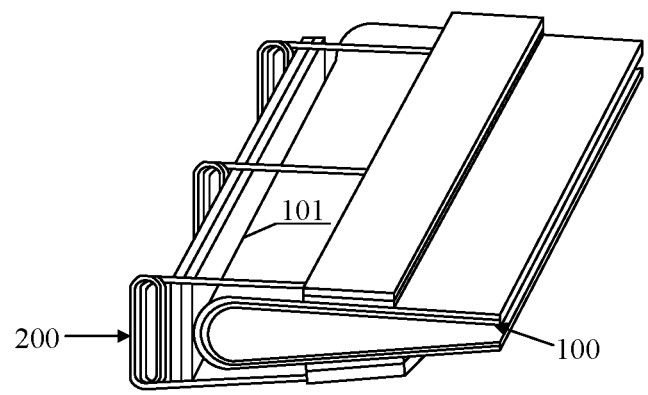
FIG. 7 is an isometric view of the foldable screen in FIG. 4.

In the present disclosure, as illustrated in FIG. 7 that is an isometric view of the foldable screen 000 in FIG. 4, the plurality of elastic portions 200 of the foldable screen 000 are uniformly distributed in the length direction of the foldable portion 101 of the flexible display panel 100. In this way, it can be ensured that the foldable portion 101 of the flexible display panel 100 is uniformly stressed in the case that the foldable screen 000 is in the flattened state, thereby further reducing the possibility of damage of the flexible display panel 100.

In some embodiments of the present disclosure, referring to FIG. 4 and FIG. 5, the foldable screen 000 may further include: a metal support layer 700 connected to the back surface of the flexible display panel 100. In this way, the metal support layer 700 may be configured to support the flexible display panel 100 in the case that the foldable screen 100 is in the flattened state, thereby improving the flatness of the flexible display panel 100; and meanwhile, the metal support layer 700 may protect the flexible display panel 100 to reduce the probability that the flexible display panel 100 is damaged during folding of the foldable screen 000.

In some embodiments, the metal support layer 700 may be a titanium plate or an alloy plate. The titanium plate and the alloy plate not only have strength to ensure a supporting property of the metal support layer 700, but also have bendability to ensure a bending property of the metal support layer 700.

Exemplarily, the alloy plate may be a steel use stainless (SUS) plate.

In some embodiments of the present disclosure, openings (not illustrated in the drawings) are provided in the region of the metal support layer 700, which is connected to the foldable portion 101 of the flexible display panel 100. In this way, the bending property of the metal support layer 700 may be improved to ensure that the foldable screen 000 may be smoothly transited from the folded state to the flattened state or from the flattened state to the folded state.

In the present disclosure, the metal support layer 700 may be connected to the surface opposite to the display surface 100a of the flexible display panel 100 via an adhesive layer (not illustrated in the drawings) to ensure a firmness of adhesion between the metal support layer 700 and the flexible display panel 100.

In one implementation of some embodiments of the present disclosure, the adhesive layer may be an optically clear adhesive (OCA) layer. The OCA has good adhesiveness and may ensure the firmness of connection between the metal support layer 700 and the flexible display panel 100.

In some embodiments, in other implementations, the adhesive layer may also be a pressure sensitive adhesive (PSA) layer or a foam layer.

In some embodiments of the present disclosure, a material of the adhesive layer on the foldable portion 101 of the flexible display panel 100 may be the same as or different from those of the adhesive layers on the flat portions 102 of the flexible display panel, and this is not limited in the present disclosure.

In some embodiments of the present disclosure, the flexible display panel 100 of the foldable screen 000 is an organic light-emitting diode (OLED) display panel.

In summary, the foldable screen according to the embodiments of the present disclosure includes: the flexible display panel and the plurality of elastic portions. During the transition of the foldable screen from the folded state to the flattened state, the connecting rods of the elastic portions may move in the first direction going away from the flexible display panel under the drive of the flat portions connected to the connecting rods. In this way, the elastic support members of the elastic portions, which are connected to the connecting rods, may move in the second direction opposite to first direction, wherein the second direction is a direction in which the elastic members move proximal to the flexible display panel. In the case that the foldable screen is in the flattened state, the elastic support members of the elastic portions are in close contact with the foldable portion, and the elastic support members may supply a support force to the foldable portion to reduce the probability that the foldable portion of the flexible display panel is creased in the case that the foldable screen is in the flattened state, thereby effectively improving the display effect of the foldable screen.

Some embodiments of the present disclosure further provide a display device. The display device may include: a power support assembly and the foldable screen according to the above-described embodiments. The power supply assembly is configured to supply power to the foldable screen. The display device may be a display device with a folding function, for example, the display device may be any product or component with a display function, such as a foldable mobile phone, a foldable tablet PC, or a foldable computer.

It should to be noted that in the drawings, the sizes of layers and portions may be exaggerated for clarity of illustration. It will also be understood that in the case that an element or layer is referred to as being "on" another element or layer, it may be directly on the other element or layer, or an intermediate layer may be present. In addition, it is to be understood that in the case that an element or layer is referred to as being "under" another element or layer, it can be directly under the other element or layer, or more than one intermediate layer or element may be present. In addition, it will also be understood that in the case that a layer or element is referred to as being "between" two layers or elements, it can be the only layer between the two layers or elements, or more than one intermediate layer or element may be present. Similar reference numerals indicate similar elements throughout the specification.

In the present disclosure, the terms "first" and "second" are only used for describing purposes and cannot be understood as indicating or implying relative importance. The term "plurality" means two or more, unless explicitly defined otherwise.

Described above are merely exemplary embodiments of the present disclosure and are not intended to limit the present disclosure. Any modifications, equivalent replacements, improvements and the like made within the spirit and principle of the present disclosure should be included within the scope of protection of the present disclosure.

What is claimed is:

1. A foldable screen, comprising:
   a flexible display panel, wherein the flexible display panel is provided with a display surface, and the flexible display panel comprises a foldable portion and two flat portions disposed on two sides of the foldable portion; and
   a plurality of elastic portions disposed on a back surface of the flexible display panel, wherein each of the elastic portions comprises an elastic support member and two connecting rods fixedly connected to the elastic support member, the two connecting rods are respectively connected to the two flat portions;
   wherein the elastic support member is configured to supply a support force to the foldable portion in the case that the display surface of the foldable portion is coplanar with that of the flat portion;
   wherein the foldable screen further comprises a first rigid support bar disposed between the elastic support member and the foldable portion, a length direction of the first rigid support bar is as same as that of the foldable portion, and the first rigid support bar is as long as the foldable portion; and
   in a case that the foldable screen is in a flattened state, an orthographic projection of the first rigid support bar on the flexible display panel is disposed in the foldable portion, and a boundary of the orthographic projection is completely coincident with that of the foldable portion;
   wherein the foldable screen further comprises two second rigid support bars disposed on the back surface of the flexible display panel and two second soft support bars disposed between the two second rigid support bars and the flexible display panel; and
   wherein an orthographic projection of the second soft support bar on the flexible display panel is in an orthographic projection of the flat portion on the flexible display panel, and the second soft support bar is adhered to the second rigid support bar and the flat portion.

2. The foldable screen according to claim 1, wherein the elastic support member is a spring coil, and the two connecting rods are connected to end portions of the spring coil respectively.

3. The foldable screen according to claim 2, wherein the spring coil is integrated with the two connecting rods.

4. The foldable screen according to claim 2, wherein the elastic portion is configured to be in a deformation state to cause the spring coil to supply the support force to the foldable portion in the case that the display surface of the foldable portion is coplanar with that of the flat portion, and configured to be in an original state to release the support force supplied by the spring coils to the foldable portion in the case that the display surfaces of the two flat portions are folded to a preset angle.

5. The foldable screen according to claim 1, wherein a surface, facing away from the foldable portion, of the first rigid support bar is connected to the elastic support member, and a surface, facing towards the foldable portion, of the first rigid support bar is in contact with the foldable portion.

6. The foldable screen according to claim 5, wherein the surface, facing away from the foldable portion, of the first rigid support bar is provided with a snap groove, and the first rigid support bar is snap-engaged with the elastic support member via the snap groove.

7. The foldable screen according to claim 5, further comprising a first soft support bar disposed between the first rigid support bar and the flexible display panel; wherein the first soft support bar is adhered to the first rigid support bar, and a surface, facing away from the first rigid support bar, of the first soft support bar is in contact with the foldable portion.

8. The foldable screen according to claim 7, wherein a boundary of an orthographic projection of the first soft support bar on the flexible display panel is coincident with that of an orthographic projection of the first rigid support bar on the flexible display panel.

9. The foldable screen according to claim 5, wherein the two second rigid support bars are fixedly connected to the two flat portions respectively, and the two second rigid support bars are movably connected to the two connecting rods of the elastic portion respectively.

10. The foldable screen according to claim 9, wherein each second rigid support bar of the two second rigid support bars is provided with an insertion hole, and an end, facing away from the elastic support member, of each connecting rod of the two connecting rods is disposed in the insertion hole.

11. The foldable screen according to claim 9, wherein length directions of the two second rigid support bars are both parallel to that of the first rigid support bar.

12. The foldable screen according to claim 11, wherein the two second rigid support bars are disposed at a same distance away from the first rigid support bar.

13. The foldable screen according to claim 1, wherein a boundary of the orthographic projection of the second soft support bar on the flexible display panel is coincident with that of an orthographic projection of the second rigid support bar on the flexible display panel.

14. The foldable screen according to claim 1, wherein materials of both the first rigid support bar and the second rigid support bar comprise rigid plastic, and materials of both the first soft support bar and the second soft support bar comprise flexible foam.

15. The foldable screen according to claim 1, wherein the plurality of elastic portions are uniformly distributed in a length direction of the foldable portion.

16. The foldable screen according to claim 1, further comprising a metal support layer connected to the back surface of the flexible display panel.

17. The foldable screen according to claim 16, further comprising an adhesive layer disposed between the metal support layer and the flexible display panel.

18. The foldable screen according to claim 1, wherein the flexible display panel is an organic light-emitting diode (OLED) display panel.

19. A display device, comprising: a power supply assembly and a foldable screen, wherein the power supply assembly is configured to supply power to the foldable screen; and the foldable screen comprises:
   a flexible display panel, wherein the flexible display panel is provided with a display surface, and the flexible display panel comprises a foldable portion and two flat portions disposed on two sides of the foldable portion; and
   a plurality of elastic portions disposed on a back surface of the flexible display panel, wherein each of the elastic portions comprises an elastic support member and two connecting rods fixedly connected to the elastic support member, the two connecting rods are respectively connected to the two flat portions;
   wherein the elastic support member is configured to supply a support force to the foldable portion in the case that the display surface of the foldable portion is coplanar with that of the flat portion;

wherein the foldable screen further comprises a first rigid support bar disposed between the elastic support member and the foldable portion, a length direction of the first rigid support bar is as same as that of the foldable portion, and the first rigid support bar is as long as the foldable portion; and in a case that the foldable screen is in a flattened state, an orthographic projection of the first rigid support bar on the flexible display panel is disposed in the foldable portion, and a boundary of the orthographic projection is completely coincident with that of the foldable portion;

wherein the foldable screen further comprises two second rigid support bars disposed on the back surface of the flexible display panel and two second soft support bars disposed between the two second rigid support bars and the flexible display panel; and wherein an orthographic projection of the second soft support bar on the flexible display panel is in an orthographic projection of the flat portion on the flexible display panel, and the second soft support bar is adhered to the second rigid support bar and the flat portion.

* * * * *